United States Patent Office 3,586,740
Patented June 22, 1971

3,586,740
HIGH IMPACT POLYSTYRENE
Stuart Schott, Cincinnati, Ohio, Stanley P. Rowland, New Orleans, La., and Melvin F. Maringer and Herbert Leonard, Jr., Cincinnati, Ohio, assignors to National Distillers and Chemical Corporation, New York, N.Y.
No Drawing. Continuation-in-part of applications Ser. No. 311,198, and Ser. No. 311,199, both Sept. 24, 1963. This application June 3, 1968, Ser. No. 733,783
Int. Cl. C08d 9/08
U.S. Cl. 260—892     27 Claims

ABSTRACT OF THE DISCLOSURE

A high impact polystyrene composition is provided which comprises a blend of from 50 to 99.5% by weight of at least one styrene type resin and from 0.5 to 50% by weight of at least one alfin rubber. The styrene type resin can be (1) a polymerized monovinyl aromatic hydrocarbon of the benzene series having the vinyl radical directly attached to a carbon atom of the aromatic nucleus and/or (2) an interpolymer of at least 70% by weight of at least one such monovinyl aromatic hydrocarbon and an alpha-alkyl styrene. The alfin rubber can be (1) a butadiene homopolymer and/or (2) an interpolymer of at least about 45% by weight of butadiene and at least one monomer selected from the group consisting of conjugated aliphatic diene and monovinyl aromatic hydrocarbons of the benzene series. If more than one alfin rubber is present, the alfin rubber polymers include at least a major proportion of a polymer having a molecular weight of from 50,000 to 1,250,000. The impact resistance is further improved if the alfin rubber has a gel content sufficient to render the percentage of gel in the total blend between about 1% and about 25% by weight.

This application is a continuation-in-part of applications Ser. Nos. 311,198 and 311,199, both filed Sept. 24, 1963, now abandoned.

This invention relates to resin compositions containing monovinyl aromatic polymer such as polystyrene, having improved impact resistance, due to the addition of one or more alfin rubbers which may have a gel content.

Polystyrene and polystyrene-type resins have many desirable properties, including tensile strength and dimensional stability to heat, but they are also exceedingly brittle, and not resistant to impact or shock. Accordingly, there has been considerable effort to modify these resins so as to improve their impact resistance without sacrificing the other desirable properties.

One approach has been to blend the polystyrene-type resin with synthetic elastomeric polymers or interpolymers, such as butadiene-styrene rubbers. In addition butadiene homopolymers have also found extensive use. Problems with these elastomers include difficulty in mixing the elastomers and the polystyrene-type of resins. Mechanical blends of the elastomer and polystyrene or other vinyl aromatic polymers have increased impact resistance, but require a high proportion of elastomer, which leads to a loss of the desirable physical properties of the polystyrene-type resin. Tensile strength and flexural stiffness of the resulting mixture decrease as more elastomers are added, and the material ultimately becomes too much like the elastomer, and is too flexible.

Various methods of mechanically mixing the material were tried, such as a Banbury mixer, a heated roller mill, or a kneader. In addition, a rubber latex was mixed with a solid monovinyl aromatic polymer and a solution of a monovinyl aromatic polymer was mixed with a suspension or emulsion of the elastomer to obtain a finely dispersed mixture of the two components. See U.S. Pat. No. 3,090,767 and Canadian Pat. No. 641,925.

However, it has been said that the greatest improvement in impact resistance with the least detriment to the overall balance of structural properties is obtained by forming a block or graft polymer of the monovinyl aromatic material with the elastomer. In this method, the synthetic elastomeric polymer, e.g., styrene-butadiene rubber, is dissolved in the vinyl aromatic monomer, and the vinyl aromatic monomer is then polymerized in the presence of the rubber, so as to form a resin which includes chains of polyvinyl aromatic material as branches on a base chain of the elastomer polymer.

Of course, this technique is not useful to resin converters. Moreover, it requires special polymerization reaction conditions to obtain this graft polystyrene polymer, and it is not susceptible to exact control of the physical properties of the finished graft polymer.

According to the present invention, modified impact-resistant monovinyl aromatic polymer compositions are provided that have an exceptionally good balance of properties, including high tensile strength, flexural stiffness, and impact strength, and which are moreover readily shaped by conventional molding and extrusion operations.

These compositions comprise (a) from about 50 to about 99.5% by weight of a monovinyl aromatic polymer such as polystyrene and (b) from about 0.5 to about 50% by weight of an alfin rubber of which a major proportion is alfin rubber of a molecular weight in the range of 50,000 to 1,250,000. It is preferred that the monovinyl aromatic polymer comprise 60 to 95% by weight of the blend, and even more preferably, at least 75% by weight of the blend.

In a preferred embodiment of the present invention, the balance of properties and the impact resistance of the resin composition are further improved by including two or more different alfin rubbers with the monovinyl aromatic polymer. Two or more alfin rubbers preferably differ in monomer content or ratio and/or in molecular weight, and at least a major portion have a molecular weight in the range of 50,000 to 1,250,000.

Further, according to the present invention, the impact-resistance and general balance of properties can be still further improved by employing an alfin rubber having a gel content from about 1 to about 25% by weight of the entire composition.

The term "monovinyl aromatic polymer" as used throughout the present specification and claims means a polymer or copolymer containing one or more polymerized or copolymerized monovinyl aromatic hydrocarbons of the benzene series having the vinyl radical directly attached to a carbon atom of the aromatic nucleus, such as styrene, vinyl toluene, vinyl xylene, ethyl vinyl benzene, chlorostyrene, ethyl vinyl toluene, isopropyl vinyl benzene, or diethyl vinyl benzene. Also included are interpolymers of at least 70% by weight of one or more of such monovinyl aromatic hydrocarbons with from 1 to 30% by weight of an alpha-alkyl styrene, such as alpha-methyl styrene, para-methyl-alpha-methyl styrene, or alpha-ethyl styrene. The preferred vinyl aromatic resins are polystyrene, polyvinyl toluene, copolymers of styrene and vinyl polymers, and copolymers of 70 to 85% by weight of styrene and from 30 to 15% by weight of alpha-methyl styrene.

The preferred base polymer should have a molecular weight and physical property characteristics such that it can be employed alone for fabrication by molding, extrusion, etc., into articles of hardness, toughness, and utility as exemplified by the polystyrenes in use commercially at present. These resins should have a molecular weight of at least 30,000 or greater, preferably a molecular weight between 50,000 and 500,000, as determined by the Staudinger viscosity method (Schildknecht, "Vinyl and Related Polymers," N.Y., Wiley, 1952, pp. 30–31). The monovinyl aromatic polymers can be prepared by any of the well-known polymerization processes disclosed in the prior art or by the use of alfin catalyst polymerization in the manner taught by A. A. Morton in numerous publications, Ind. & Eng. Chem. 42, 1488–1496 (1950); J. Amer. Chem. Soc. 69, 161; 167; 950; 1675; 2224 (1947); and in U.S. Patents No. 3,223,691, patented Dec. 14, 1965, and No. 3,607,187, patented Dec. 4, 1962, to Greenberg et al.

The term "alfin rubber" in this specification and claims means a rubber prepared by polymerization, using an alfin catalyst, of a diene monomer selected from the group consisting of (1) butadiene homopolymers and (2) interpolymers of at least about 45% butadiene with at least one monomer selected from the group consisting of conjugated aliphatic dienes and monovinyl aromatic hydrocarbons of the benzene series. Thus, the interpolymers may comprise copolymers or terpolymers such as butadiene-styrene, butadiene-isoprene, butadiene-isoprene-styrene, and the like having at least about 48% combined butadiene.

Morton and co-workers, in a series of papers in the Journal of the American Chemical Society, starting in 1947, describe an organo alkali-metal catalyst for the polymerization of olefins and particularly dienes which they termed an alfin catalyst, J. Amer. Chem. Soc. 69, 161; 167; 950; 1675; 2224 (1947). The name "alfin" was taken from the use of an alcohol and an olefin in their preparation. The alcohol, a methyl n-alkyl carbinol, in the form of the sodium salt, and the olefin, also in the form of the sodium salt, form a complex that constitutes the catalyst.

These were reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Ind. Eng. & Chem. 42, 1488–1496 (1950). There, Morton pointed out that alfin catalysts were different from other sodium compound catalysts and sodium metal in nearly every respect. They cause polymerization in minutes, whereas other sodium compounds or sodium metal require considerably more time. A few milliliters of catalyst suspension in a solution of 30 ml. of butadiene in 150 ml. of pentane will set to a solid gel within seconds, and the contents will erupt from a cork-stoppered bottle within about two minutes. No intermediate products can be isolated. The polymerization reaction proceeds with a high proportion of 1,4-addition, in contrast to a tendency to 1,2-addition in ordinary sodium-catalyzed polymerization.

The polymers obtained using alfin catalysts were termed alfin polymers or alfin rubbers, and contain sodium in the molecule. Because of the speed and ease of the reaction, these attracted considerable interest in the 1940's and early 1950's. However, the very speed of the reaction led to problems. The alfin rubbers had the disadvantage of having an extremely high molecular weight, generally in excess of three million, and frequently in excess of ten million. As a result, although the polymers are generally gel-free and have high tensile strength, superior abrasion resistance and tear strength, they are also very tough, and exhibit little breakdown and, consequently, poor banding, on the mill. Therefore, they are difficult if not impossible to process using conventional equipment. Consequently, interest and research in the alfin rubbers has decreased in recent years, and in this original form they have found very little commercial application.

It is quite surprising that such alfin rubbers can be useful in the compositions of the invention, and in this environment are compatible with monovinyl aromatic polymers, even in small amounts. Even though the alfin rubbers preferably have a molecular weight of less than 1,250,000, it is possible to employ polymers having a molecular weight of over 2,000,000 and even over 5,000,000.

In order to obtain desirable final properties in the impact-resistant polystyrene resin compositions, at least a major proportion of the alfin rubber must have a molecular weight of from 50,000 to 1,250,000. The higher molecular weight polymers generally exhibit poor processability, failing to blend with the vinyl aromatic resins to obtain useful compositions. Generally, the surface appearance and physical properties of materials made solely from the high molecular weight polymers do not meet the required standards for physical properties necessary for a useful molding composition.

Alfin rubbers having the desired molecular weight are obtainable by using molecular weight modifiers in combination with the alfin catalysts. Examples of one such process are disclosed in U.S. Patents No. 3,067,187, granted Dec. 4, 1962, and No. 3,223,691, granted Dec. 14, 1965 to Greenberg et al. These rubbers can include homopolymers of the conjugated dienes, e.g. butadienes, or copolymers or terpolymers or other interpolymers thereof with other conjugated aliphatic dienes with or without the presence of alkenyl aromatic monomers. As disclosed in said patents, the alfin rubbers of lower molecular weight are prepared by polymerization in the presence of an alfin catalyst and certain dihydro derivatives of aromatic hydrocarbons, preferably 1,4-dihydrobenzene and 1,4-dihydronaphthalene, which act as molecular weight moderators. Since the method is fully described in U.S. Patent No. 3,067,187, no detailed description of the process is required here and the disclosure of said patent is hereby incorporated by reference.

Alfin rubbers having a molecular weight in the range of 50,000 to 1,250,000 may also be produced according to the method described in copending application Ser. No. 320,933, filed Nov. 1, 1963 to Birchall et al. which describes carrying out the polymerization in the presence of an alfin-type catalyst comprising an intimate mixture in an inert diluent of an alkali metal salt of a methyl-n-carbinol, a finely-divided alkali metal halide, and a dialkali metal diallylic-type hydrocarbon compound selected from the group represented by the Formulae 1

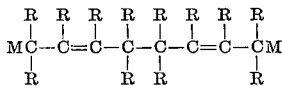

wherein M is an alkali metal and R is selected from the group consisting of hydrogen and a saturated hydrocarbon radical of from one to four carbon atoms, and (2)

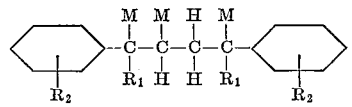

wherein $R_1$ and $R_2$ are selected from the group consisting of alkyl groups having one to four carbon atoms and hydrogen atom and M is an alkali metal. By employing an alfin catalyst of the above type as described in the just-mentioned copending application, it is not necessary to utilize molecular weight moderators to obtain lower molecular weight alfin polymers, though such moderators may optionally be employed if desired.

It is essential to the practice of the present invention that the alfin-rubber comprise in a major proportion a polymer or interpolymer having a molecular weight between 50,000 and 1,250,000. Thus, when a single butadiene homopolymer or a single butadiene interpolymer is blended with the styrene-type resin it must have a molecular weight within the range of 50,000 to 1,250,000 to produce the desirable properties in the products of this invention. When more than one alfin-catalyzed homopolymer or interpolymer is employed, a major proportion of such mixed polymers or interpolymers must possess a molecular weight between 50,000 and 1,250,000. Any other suitable procedure which may be used to obtain the alfin rubbers having the desired molecular weight can also be used in the present invention.

The alfin rubber-monovinyl aromatic polymer compositions of the present invention show a surprising additional improvement if there be used a combination of two or more different alfin rubbers. Generally, the compositions containing two or more alfin rubbers are tougher, higher in tensile strength and stiffness as well as higher in resistance to fracture by impact and more easily processable by the usual means of injection molding, extrusion, vacuum forming or other common industrial fabrication processes.

It has further been surprisingly discovered that the high molecular weight alfin rubbers having a molecular weight of over 2,000,000, and generally over 5,000,000, can also be used in the present invention in admixture with a major proportion of an alfin rubber of lower molecular weight as defined above. The alfin rubbers of high molecular weight are generally noted as having high flex life values, high tensile strength, superior abrasion resistance and tear strength. Generally, however, because of their high molecular weight these alfin rubbers are extremely difficult to mix with the polystyrene. They are very tough and exhibited little breakdown and extremely poor banding upon being milled. Mixtures of the high molecular weight rubbers and polystyrene result in extremely rough stocks having an undesirable pearly surface luster.

However, when these high molecular weight alfin rubbers are mixed with the lower molecular weight alfin rubbers as defined above, they are rendered sufficiently compatible with the monovinyl aromatic polymer, so as to be readily mixed therein and to result in a homogeneous composition having the desirable physical properties without the undesirable surface appearance normally associated with such materials.

Whether one or more alfin rubbers are utilized, the total combined amount of alfin rubber should be from 0.5% to about 50% by weight of the total composition with the monovinyl aromatic polymer. The ratio of the monovinyl aromatic polymer to the alfin rubber depends upon the particular polymers and rubbers utilized, the degree of impact resistance desired, and the overall balance of properties required for any particular composition. Generally, the preferred ratio of components is such that the composition contains a total of from about 5 to about 30% by weight of combined butadiene in the composition, present as alfin rubber, and the best results are obtained with a maximum of about 10% by weight of combined butadiene in the composition, present as alfin rubber.

Preferably, the alfin rubber is a copolymer of styrene and butadiene and contains from about 75% to about 90% by weight of combined butadiene and from about 25% to about 10% by weight of combined styrene.

In the multiple alfin rubber-containing composition, it is preferred that the alfin rubbers be as different as possible from each other. For example, they can differ in the monomers used to produce the polymer, in molecular weight, and if the same comonomers are used, the polymers preferably differ in the weight ratio of comonomers utilized. Preferably, the alfin rubbers contain the same monomers, but in different ratios, and have different molecular weights. Preferably, one alfin rubber contains from 75% by weight to about 90% by weight of combined butadiene and from about 10% by weight to about 25% by weight of combined styrene. The second alfin rubber preferably contains from about 50% by weight to about 75% by weight of combined butadiene and from about 25% by weight to about 50% by weight of combined styrene. Generally, where two or more of the preferred butadiene-styrene alfin rubbers are utilized, the two alfin rubbers differ in combined butadiene content by from 10% by weight to about 25% by weight. Where a third alfin rubber component is used, it also differs from the other two in comonomer ratio. If the rubber contains a minor proportion of a high molecular weight alfin rubber, i.e., above 1,250,000 and especially above 2,000,000, the high molecular weight rubber preferably contains no more than about 90% by weight of butadiene, and the best results are obtained with no more than about 80% by weight of butadiene.

The above weight ratios are given for the butadiene-styrene alfin rubbers. However, if other monomers are utilized, such as vinyl toluene or another conjugated diene, such as isoprene, the weight ratios should be adjusted proportionately based upon the differences in molecular weight.

Though it is not certain why the use of an alfin rubber provides improved properties, relative to previously known elastomers when mixed with monovinyl aromatic polymer resins, it is hypothesized that the alfin rubbers, as defined herein, have compatibility characteristics with the polystyrene-type resins superior to those provided by elastomers prepared by conventional polymerization processes, as disclosed in the prior art.

A further surprising improvement in the impact resistance and overall balance of properties of the monovinyl aromatic polymer can be obtained by adding an alfin rubber containing a gel content sufficient to render the percentage of gel in the total blended composition between about 1% and about 25% by weight.

The gel can be introduced into all or part of the alfin rubber, to make up the total amount set forth above. Where two or more alfin rubbers are present, the gel can be present in either or both of the alfin rubbers. The gel content of each alfin rubber can vary from about 2% by weight to about 80% by weight, and mixtures of two or more rubbers each having different proportions of gel are also suitable.

The gel content can be introduced into the alfin rubber either during the polymerization process or subsequent to polymerization, by controlled mastication of the polymer.

The gel can be introduced during polymerization by any conventional means, including incorporating known cross-linking agents, such as divinyl benzene, 1,1,4,4-tetramethyl butadiene-1,3 or other difunctional monomers; using peroxide catalysts, e.g. organic tertiary hydroperoxide, dicumyl peroxide and the like; or persulfate catalysts, e.g. potassium persulfate. These additives are incorporated under the above-described polymerization conditions, in addition to the alfin catalyst and any molecular weight modifier, as described above.

The concentration of difuctional monomer added to the polymerization reaction will vary from about 0.1 weight percent to approximately 5 weight percent of the total monomer concentration. It is preferred that the difunctional monomer be added at the start of the polymerization. However, if desired it may be added at any later time during the course of the polymerization reaction. When using a peroxide catalyst, the concentration may vary from about 0.05% by weight to about 2% by weight of the peroxide based upon the total weight of monomers present and the peroxide is preferably added after polymerization is at least partially completed.

Gel can also be incorporated during polymerization in the presence of the alfin catalyst by using smaller quantities of molecular weight modifiers, namely, certain dihydro derivatives of aromatic hydrocarbons, such as 1,4-dihydrobenzene and 1,4-dihydronaphthalene. To produce a gel-containing rubber, the molecular weight modifier should be employed in a quantity ranging from 0.1 part to 10 parts per 100 parts of total monomer, the amount depending upon the ratio of monomers employed as well as the concentration of gel desired. A preferred range will be from 0.4 to 1.4 parts of the molecular weight modifier per 100 parts monomer.

Gel may also be introduced into an alfin rubber following polymerization by a mechanical kneading process. The extent of gelling is determined by the time and temperature of mastication or by the optional addition of a cross-linking agent, i.e., one of the difunctional monomers referred to above.

Gel can be introduced in a mechanical kneading process of the alfin rubber using a two-roll compound mill, a Banbury mixer, a compounding extruder, or other such apparatus which will shear the alfin rubber to the proper degree to obtain cross-linking and formation of polymer gel. Since the gel introduction depends on the amount of mechanical shear introduced by the mechanical equipment, the temperature and time of mastication for a particular gel content will depend on the equipment employed and molecular weight characteristics of the alfin rubber. Temperatures of 200° F. to 400° F. and kneading times of one minute to 120 minutes may be employed. For the two-roll compounding mill a kneading time of 5 minutes to approximately 30 minutes at a temperature of from 275° F. to approximately 325° F. is preferred.

By the use of peroxide during mastication, gel formation is more rapid, and, as above noted, depends upon the equipment employed and the molecular weight characteristics of the rubber. In addition, the time and temperature of mastication depend upon the peroxide and its concentration. Mastication times of 1 to 120 minutes at temperatures from 200° F. to 400° F. may be employed. With the two-roll compounding mill the preferred mastication temperatures are from approximately 275° F. to approximately 325° F. and the preferred kneading times are from approximately 3 minutes to approximately 10 minutes. The preferred peroxide is dicumyl peroxide and the preferred concentration is from approximately 0.01% to 1% and preferably from about 0.05% by weight to 0.5% by weight of the alfin rubber.

The desired gel content in the total composition depends at least in part upon the method of incorporation of the gel, the comonomer ratio of the gelled elastomer, and the properties desired for the blended composition. Generally, the preferred gel content of the alfin rubber elastomer is from about 2% by weight to about 80% by weight, and preferably in the range from about 25% to about 70% by weight when the gel is formed by controlled mastication. The preferred range for alfin rubber with gel formed using peroxide catalysts during mastication is from 25% to about 50% by weight. The preferred gel range for alfin rubber with gel formed during polymerization is from 10% to about 50% by weight.

The amount of polymer gel content in the alfin-produced polymer is determined by immersing the rubbery polymer in toluene and centrifuging to obtain the insoluble gel portion. Approximately 0.2 part by weight of elastomer is immersed in approximately 100 parts by volume of toluene and centrifuged for 8 hours. The insoluble swollen gel portion is then filtered from the solution of the soluble portion and dried under vacuum to remove all solvents. The weight of dried insoluble gel portion divided by the total weight of the polymer immersed in the solvent is the weight fraction of polymer gel present. Multiplication by 100 yields the weight percent of the polymer gel present in the elastomer.

It is not completely understood why the addition of the above described amount of gel provides improved properties relative to the same alfin rubber systems without gel being present. Possibly, the polymer gel becomes dispersed in the homogeneous phase of the blended monovinyl aromatic polymer and ungelled alfin rubber, but remains bound to the ungelled rubber by either physical or chemical forces and thus provides increased resistance to deformation by physical impact. The dispersed gels then become centers for the absorption of impact shock in the blended resin system.

It is pointed out that by using the alfin rubbers the properties of the compositions are preferable to monovinyl aromatic polymer compositions containing the conventional types of rubbers, even when prepared as block or graft polymers, and even though usually the block or graft polymer mixture produces a more efficient and desirable balance of properties. However, a comparison of graft polymers formed using the conventional type of elastomers with polystyrene with the mechanically mixed alfin rubber-polystyrene compositions of the present invention, shows that the alfin rubber-containing compositions have superior properties.

A further unexpected aspect of the use of the alfin rubber is the effect of mixing the alfin rubber with a conventional type of elastomer such as GBS or SBR butadiene-styrene rubber. This combination, rather than showing the improvement effected from utilizing a mixture of elastomers generally has an impact resistance and overall balance of properties less desirable than that of a polystyrene resin composition formed with the single alfin rubber. This is a most unusual aspect of the invention, and points up the unique properties of the alfin rubbers compared to the conventional synthetic rubbers previously used.

In carrying out the process of this invention, the alfin-rubber or rubbers is mixed with the monovinyl aromatic polymer to obtain a thorough distribution of the rubber throughout the polymer. The components can be blended or incorporated with one another in any of the conventional ways, e.g., by heat plastifying the ingredients and mechanically working the same in admixture with one another on compound rolls, in a Banbury mixer, or in a plastic extruder, to obtain a uniform or substantially uniform heat-plastified mass containing the polymeric ingredients in the desired proportions. This heat-plastified mass is then fabricated to a finished product or cooled and subdivided into a form suitable for subsequent fabrication, i.e., molding, extrusion, and the like.

In addition, inert ingredients such as stabilizers, lubricants, antioxidants, pigments, and inert fillers can be incorporated by the same blending procedure, as described, at the same time or by a subsequent blending process.

Blending conditions will depend on the characteristics of the resinous and elastomeric polymer being blended and upon the equipment employed for the blending process. Blending temperatures may vary from about 200° F. to about 500° F. and blending time may vary from about a few seconds to about two hours. Temperatures of 250° to 350° F. and a time of 30 to 60 minutes are generally preferred when blending is performed with a two-roll rubber compounding mill. Mixing time will be controlled by that required to obtain a homogeneous dispersion of the alfin rubber and the monovinyl aromatic polymer and this in general will be indicated by the disappearance of the pearly luster which develops during the early stages of mixing.

In order to more clearly illustrate the practice of the present invention, the following examples are presented. Parts are given by weight, unless otherwise specified. These examples and embodiments are illustrative only, and the invention is not intended to be limited thereby except as indicated by the appended claims.

PREPARATION OF ALFIN CATALYST

The preparation of the alfin catalyst employed in the examples was carried out as follows:

Dry hexane (660 parts) was charged to a 3-necked flask provided with stirrer, inert gas sweep, a Dry Ice reflux condenser system, and an external cooling bath. To this was added 132.4 parts of finely-divided sodium (2 microns maximum particle size) (1.6 gram-atoms) dispersed in alkylate. The slurry was cooled to −10° C., and 102 parts of dry n-amyl chloride (0.84 mole) was added slowly with moderate stirring which was continued for one hour after the addition had been completed. Then 30.6 parts of isopropyl alcohol (0.4 mole) was added slowly. Stirring was then maintained for an additional 45 minutes. Excess dry propylene (C.P. grade) was subsequently introduced into the mixture, the temperature of which was maintained at −10° C. until active reflux of the propylene occurred. The temperature was then raised gradually to 25° C., and the mixture was stirred at this temperature for two hours. During the last 15 minutes the propylene was allowed to leave the system and was collected for recycle. The reaction slurry was transferred to a storage vessel maintained in an inert atmosphere of argon and was then diluted to 1120 parts with dry hexane. This slurry, that is, the alfin catalyst, contained 0.4 mole of sodium isopropoxide, 0.4 mole of allyl sodium, and 0.8 mole of sodium chloride.

The following examples are divided into three groups. The first group illustrates preparation of impact-resistant, polystyrene resin compositions containing a single alfin rubber. The second group illustrates preparation of impact-resistant polystyrene resin compositions containing a plurality of alfin rubbers. The third group illustrates preparation of impact-resistant polystyrene resin compositions wherein the alfin rubber also includes a preparation of gel.

Controls are included as lettered examples. The examples of the invention bear numbers.

Example A

A styrene-butadiene alfin rubber was prepared using a one quart (0.828 liter) size "pop" bottle as the polymerization reactor. To the bottle was charged 400 cc. of hexane (which had been dried through molecular sieves), 75.5 grams of butadiene, 28 grams of styrene, and 100 cc. of alfin catalyst suspension as prepared above. The bottle was closed with a screw-top cap and mildly agitated by rotation. The components were allowed to react for two hours and then the rubbery copolymer was removed from the bottle. Using a Waring Blendor the alfin rubber was washed 3 times with 180-proof ethanol, then 3 times with water, and then with acetone. Each wash contained a few crystals of N-phenyl-2-naphthylamine as anti-oxidant such that the alfin rubber contained about 0.5% of anti-oxidant by weight based on the total weight of rubber. The alfin rubber having a molecular weight of 4,000,000 was then dried to remove residual moisture and solvent using a two-roll rubber mill at 300° F. The alfin rubber containing 75% by weight of combined butadiene and 25% by weight of combined styrene, was then blended with polystyrene in the following manner:

To obtain thorough mixing of the resinous polymer and the alfin rubber a two-roll rubber compounding mill was employed. To 86.7 parts by weight of a general purpose polystyrene resin (having a melt index flow rate of 0.87 g./10 min. and a molecular weight of 100,000 as determined by the Staudinger method) fluxing on the mill was added 13.3 parts by weight of the above described elastomer. The two polymers were fluxed on the mill at 325° F. for sixty minutes (until the pearly luster disappeared) and then the homogeneous or substantially homogeneous blend was removed from the mill as a sheet and cooled. This sheet was granulated and then injection molded using a 1 oz.-Minijector molder to obtain test specimens for physical properties evaluation. The composition of the resin is set forth in Table I and the physical properties are tabulated in Table II.

Example B

Using the same mixing procedure and the same polystyrene resin and alfin rubber as described in Example A, a blend of 73.3 parts by weight of polystyrene and 26.7 parts by weight styrene-butadiene copolymer was prepared and evaluated for physical properties, which are tabulated in Table II. The composition of the resin is set forth in Table I.

Example 1

An alfin rubber containing 15 parts by weight of combined styrene and 85 parts by weight of combined butadiene was prepared according to the polymerization procedure of Example A except that 25 cc. of 1,4-dihydronaphthalene molecular weight control modifier was charged with the other ingredients. The copolymer had a molecular weight of 195,000.

Following the blending and evaluation procedures as outlined in the above examples, 88.2 parts by weight of general purpose polystyrene (having a melt index flow value of 0.77 g./10 min. and a molecular weight of 95,000 as determined by the Staudinger method) and 11.8 parts by weight of the above alfin rubber were blended, molded into test specimens, and evaluated for physical properties. The composition of the resin is set forth in Table I and the physical properties are tabulated in Table II.

Example 2

The same polymers and same procedure as in Example 1 were employed except that 76.5 parts by weight of polystyrene and 23.5 parts by weight of the alfin rubber were blended together. The resulting resin was tested as above. The resin composition is set forth in Table I and physical properties are tabulated in Table III.

Example 3

An alfin polystyrene was prepared using a one quart size "pop" bottle as a reactor. To the bottle was charged 400 cc. of dry hexane, 91.0 g. of styrene monomer, and 100 cc. of alfin catalyst suspension as described above. The bottle was closed with a screw top cap and mildly agitated by rolling for two hours. At this time the polymer was removed from the bottle and purified by 2 washings with 180-proof ethanol followed by two washes with water using a Waring blendor to obtain intimate contact of the washing medium with the polymer. A white powder was obtained and this was dried in a vacuum oven to remove residual moisture and solvent.

The above prepared alfin-catalyzed polystyrene with a molecular weight of 375,000 as determined by the Staudinger method was blended with the 15:85 styrene-butadiene alfin rubber as prepared in Example 1 using 88.2 parts by weight of polystyrene and 11.8 parts by weight of rubber. Blending was carried out on a two-roll rubber mill using a cycle of 40 minutes at 325–350° F. The blended composition was injection molded into test specimens and the results of the tests are tabulated in Table II. The resin composition is set out in Table I.

Example 4

The same polymers employed in Example 3 were blended at a ratio of 76.5 parts by weight of polystyrene to 23.5 parts by weight of alfin rubber. The resin composition was injection molded to form test specimen. The results of tests on this material are tabulated in Table III and the resin composition set forth in Table I.

Comparative Example C

For comparison, a blended high-impact polystyrene composition was prepared employing a commercial styrene-butadiene elastomer as is disclosed in prior art for admixture with polystyrene to form impact-resistant resins.

To 86.7 parts by weight of the same general purpose polystyrene as employed in Example 1 fluxing on a warm two-roll compounding mill was added 13.3 parts by weight of GRS rubber Plioflex 1006 as supplied by Goodyear Rubber Co., which is a hot, rubbery, non-staining, non-discoloring rubber with no oil extension, polymerized at 122° F. with fatty acid emulsifier and coagulated by a salt-acid mixture. It has a Mooney Viscosity ML-4' at 212° F. of 44–52 and a specific gravity of 0.94. The two polymers were fluxed on the mill for forty minutes (until homogeneous as indicated by the disappearance of a pearly luster). The blended sheet was cooled, granulated, injection molded into test specimens, and evaluated for physical properties. The test results are tabulated in Table II and the resin composition set forth in Table I.

Comparative Example D

The polymers employed in Example C were blended at a ratio of 73.3 parts by weight of polystyrene to 26.7 parts by weight of elastomeric copolymer, and molded into test specimens as in Example C. The specimens were tested and the test data is tabulated in Table III. The resin composition is set forth in Table I.

TABLE I.—SUMMARY OF COMPOSITIONS

| Example | X<br>Alkenyl aromatic polymer | Y<br>Alfin rubber | M.W.<br>of Y | X/Y | Blend,<br>styrene/<br>butadiene |
|---|---|---|---|---|---|
| A | Polystyrene (conventional) | 25/75 styrene-butadiene | 4,000,000 | 86.7/13.3 | 90/10 |
| B | do | do | 4,000,000 | 73.3/26.7 | 80/20 |
| 1 | do | 15/85 styrene-butadiene | 195,000 | 88.2/11.8 | 90/10 |
| 2 | do | do | 195,000 | 76.5/23.5 | 80/20 |
| 3 | Polystyrene (alfin) | do | 195,000 | 88.2/11.8 | 90/10 |
| 4 | do | do | 195,000 | 76.5/23.5 | 80/20 |
| | | Elastomer | | | |
| C | Polystyrene (conventional) | GRS Rubber | (¹) | 86.7/13.3 | 90/10 |
| D | do | do | (¹) | 73.3/26.7 | 80/20 |

¹ Mooney viscosity ML-4′ at 212° F. of 44 to 52.

TABLE II

| Properties | Ex. A | Ex. 1 | Ex. 3 | Ex. C |
|---|---|---|---|---|
| Tensile strength, p.s.i. | 5,900 | 4,200 | 5,500 | 4,700 |
| Flexural stiffness, p.s.i. | 157,000 | 148,000 | 158,000 | 159,000 |
| Izod unnotched impact strength, ft. lbs./sq. in. | 2.90 | 5.50 | 6.60 | 3.00 |
| Tensile strength×impact strength×stiffness | $2.7 \times 10^9$ | $3.42 \times 10^9$ | $5.70 \times 10^9$ | $2.20 \times 10^9$ |
| Processability of polymers to obtain blend | (¹) | (²) | (²) | Good |

¹ Poor—Difficult to blend.
² Very good.

TABLE III

| | Blends | | | |
|---|---|---|---|---|
| Properties | Ex. B | Ex. 2 | Ex. 4 | Ex. D |
| Tensile strength, p.s.i. | 4,700 | 3,600 | 3,800 | 2,900 |
| Flexural stiffness, p.s.i. | 136,000 | 125,000 | 123,000 | 127,000 |
| Izod unnotched impact strength (ft. lbs./sq. in.) | 2.50 | 6.00 | 5.60 | 4.60 |
| Tensile strength×impact strength×stiffness | $1.60 \times 10^9$ | $2.70 \times 10^9$ | $2.60 \times 10^9$ | $1.70 \times 10^9$ |
| Processability of polymers to obtain blend | (¹) | (²) | (²) | (³) |

¹ Poor—Difficult to blend.
² Very good.
³ Good.

Table II shows the results of tests of mixtures of polystyrene and an elastomer wherein the overall composition of styrene to butadiene is 90:10. Comparative Example A contained an alfin rubber prepared without any molecular weight control, so that its molecular weight was 4,000,000, i.e. far above that of the present invention. Comparative Example B contained a non-alfin type elastomer, i.e. commercial GRS synthetic rubber, a conventional type of butadiene-styrene copolymer. A comparison of the physical properties of comparative Examples A and C with Examples 1 and 3 shows that the compositions according to the present invention had the best balance of properties. Example A, containing the high molecular weight alfin rubber did not result in a useful product. It was not only difficult to blend, but failed to provide the desired increase in impact resistance achieved by Examples 1 and 3. Similarly, comparative Example C, containing the conventional elastomer of the same molecular weight failed to provide the desired increase in impact-resistance required for an impact-resistant polystyrene resin. As explained above, in addition to impact strength, the overall balance of physical properties, including tensile strength and flexural stiffness, is important. The balance of physical properties is evaluated by the numerical multiplication product of the impact strength times the tensile strength times the flexural stiffness. This value is also given in Tables II and III, and it shows examples according to this invention Nos. 1 and 3 and 2 and 4 to be in each case a superior to the comparative Examples A, C, B and D.

Table III shows the results of a series of tests on resin blends containing an overall proportion of 80 parts by weight of combined styrene to 20 parts of combined butadiene. Comparative Example B contains unmodified high molecular weight alfin rubber and comparative Example D contains commercial GRS rubber in the same proportions. A comparison of the properties of Examples 2 and 4 prepared according to the present invention, show the same improvement in impact resistance.

In the next series of examples, the further improvement in impact strength and overall balance of properties is shown by using a plurality of alfin rubbers.

TWO OR MORE ALFIN RUBBERS

Alfin rubber I

A quart soda bottle (0.828 liter) fitted with a screw-top pressure seal cap was used in the polymerization reactor. To the bottle was charged 400 parts by volume of dry hexane, 25 parts by volume of 1,4-dihydronaphthalene molecular weight control modifier solution (containing 13.3% dihydronaphthalene), 86.4 parts by weight butadiene, and 15.5 parts by weight styrene under nitrogen atmosphere at about −15° C. Then 100 parts by volume of alfin catalyst suspension as described above was injected and the bottle sealed and shaken. The reaction was allowed to proceed at ambient temperature for 2 hours with occasional shaking. The bottle was then opened and a rubbery copolymer removed. Using a Waring blendor the polymer was washed 3 times with 100 parts by volume of 180-proof ethanol containing 0.2% N-phenyl β-naphthylamine anti-oxidant, then 3 times with 100 cc. of water, and then once with 100 parts by volume acetone. The shredded product was dried at 50° C. and 2 mm. Hg to yield 99.8 parts by weight of alfin rubber having a molecular weight of 195,000 and identified in Table IV as alfin rubber I.

Alfin rubber II

A styrene-butadiene alfin-rubber was prepared using a one quart (0.828 liter) size "pop" bottle as the polymerization reactor. To the bottle was charged 400 cc. of hexane (which had been dried through molecular sieves), 75.5 grams of butadiene, 28 grams of styrene, and 100 cc. of alfin catalyst suspension as prepared above. The bottle was closed wth a screw-top cap and mildly agitated by rotation. The components were allowed to react for two hours and then the rubbery copolymer was removed from the bottle. Using a Waring blender the alfin rubber was washed 3 times with 180-proof ethanol, then 3 times with water, and then with acetone. Each wash contained a few crystals of N-phenyl-2-naphthylamine as anti-oxidant such that the alfin rubber contained about 0.5% of antioxidant by weight based on the total weight of rubber. The alfin rubber having a molecular weight of 4,000,000 was then dried to remove residual moisture and solvent using a two-roll rubber mill at 300° F. The alfin rubber containing 75% by weight of combined butadiene and 25% by weight of combined styrene, was then blended with polystyrene in the following manner:

To obtain thorough mixing of the resinous polymer and the alfin rubber, a two-roll rubber compounding mill was employed. To 86.7 parts by weight of a general purpose polystyrene resin (having a melt index flow rate of 0.87 g./10 min. and a molecular weight of 100,000 as determined by the Staudinger method) fluxing on the mill was added 13.3 parts by weight of the above described alfin rubber. The two polymers were fluxed on the mill at 325° F. for sixty minutes (until the pearly luster disappeared) and then the homogeneous or substantially homogeneous blend was removed from the mill as a sheet and cooled. This sheet was granulated and then injection molded using a 1-oz. Minijector molder to obtain test specimens for physical properties evaluation. The composition of the resin is set forth in Table I and the physical properties are tabulated in Table II (Example A).

Examples 5 and 6

Blends of the same general purpose polystyrene and the two alfin rubbers I and II were prepared by thoroughly mixing the resinous polymer and the two elastomers on a two-roll rubber compounding mill. In each case the two elastomers and a general purpose polystyrene (having a melt index flow rate ($I_2$) of 0.80 g./10 min. and a molecular weight of 100,000 as determined by the Staudinger method), were dry blended and then added to a warm mill. The polymers were fluxed on the mill at 325° F. forty minutes (until the pearly luster disappeared) and then the homogeneous or substantially homogeneous blend was removed from the mill as a sheet and cooled. This sheet was granulated and then injection molded using a 1-oz. Minijector molder to obtain test specimens for physical properties evaluation. These proportions are tabulated in Table V. The ratio of components employed is indicated in Table IV.

Examples 7 and 8

Blends of the same general purpose polystyrene and alfin rubber I and a second rubbery copolymer prepared by the procedure described for the preparation of alfin rubber I but using the ratio of materials set forth in Table IV were prepared by the blending procedure described in Example 5. The second copolymer had a molecular weight of 325,000 and is identified as copolymer IV in Table IV. Table V sets forth the physical properties of the blend.

Comparative Example E

Blended with alfin rubber I and general purpose polystyrene (having a melt index flow rate ($I_2$) of 0.80 g./10 min. and a molecular weight of 100,000 as determined by the Staudinger method) was a commercial polybutadiene (Cis-4 Rubber as supplied by Phillips Chemical Co.) rubber with Mooney viscosity ML-4′ at 212° F. of 45. Blending procedure was as indicated in Example 5 and the ratio of components is indicated in Table IV where the commercial elastomer is identified by the letter V. Properties data for the blend are tabulated in Table V.

Alfin rubber III

The polymerization procedure as described for Alfin rubber I was employed to prepare a rubbery copolymer from the reactants and proportions set forth in Table IV. This elastomer had a molecular weight of 200,000 and is identified by numeral III in Table IV.

Examples 9 and 10

These compare to Examples 5 and 6 except that styrene-butadiene ratio of 80:20 was employed. Alfin rubbers I and II were employed together with polystyrene at two different weight ratios as indicated in Table IV. Properties data for the blends are tabulated in Table VI.

Examples 11 and 12

Alfin rubbers I and III were combined with polystyrene at different weight ratios as indicated in Table IV for a combined styrene-butadiene weight ratio of 80:20. Physical properties data are listed in Table VI.

Examples 13 and 14

These compare to Examples 7 and 8 (alfin rubbers I and IV) but with 80:20 combined styrene-butadiene ratio. Table IV lists the ratio of rubbery copolymers employed and Table VI lists the properties data for the blend.

Comparative Example F

For 80:20 ratio this example employed the commercial polybutadiene rubber V disclosed in Comparative Example E with the alfin rubber I. Table VI lists the test results for this example.

TABLE IV.—COMPOSITIONS OF BLENDED RESINS

| Elastomer copolymer polymerization | Alfin rubber I | Alfin rubber II | Alfin rubber IV | | Comparative Ex. E |
|---|---|---|---|---|---|
| Components: | | | | | |
| Styrene, parts by wt | 15.5 | 28 | 55.5 | | |
| Butadiene, parts by wt | 86.4 | 75.5 | 55.5 | | |
| Modifier, parts by wt | ¹25 | | ²5 | | |
| Catalyst, parts by vol | 100 | 100 | 100 | | |
| Styrene:butadiene ratio | 15:85 | 30:70 | 50:50 | | |
| Molecular weight | 195,000 | 4,000,000 | 325,000 | | |
| Code, Example | | 5 | 6 | 7 | 8 |
| Blend components: | | | | | |
| Rubbery copolymer (1): | | | | | |
| Code | | I | I | I | I | I |
| Parts by weight | | 8.8 | 10.6 | 8.8 | 10.6 | 5.9 |
| Rubbery copolymer (2): | | | | | |
| Code | | II | II | IV | IV | V |
| Parts by weight | | 3.3 | 1.3 | 5.0 | 2.0 | 5.0 |
| General purpose polystyrene, parts by wt | | 87.9 | 88.1 | 86.2 | 87.4 | 89.1 |
| Overall styrene:butadiene, ratio of blend | | 90:10 | 90:10 | 90:10 | 90:10 | 90:10 |

| Elastomer copolymer polymerization | Alfin rubber III | Ex. 9 | Ex. 10 | Ex. 11 | Ex. 12 | Ex. 13 | Ex. 14 | Comparative Ex. F |
|---|---|---|---|---|---|---|---|---|
| Components: | | | | | | | | |
| Styrene, parts by wt | 56.6 | | | | | | | |
| Butadiene, parts by wt | 58.9 | | | | | | | |
| Modifier, parts by vol | ²10.6 | | | | | | | |
| Catalyst, parts by vol | 12.5 | | | | | | | |
| Styrene:butadiene ratio | 49:51 | | | | | | | |
| Molecular weight | 200,000 | | | | | | | |
| Code | III | | | | | | | |
| Blend components: | | | | | | | | |
| Rubbery copolymer (1): | | | | | | | | |
| Code | | I | I | I | I | I | I | I |
| Parts by weight | | 21.2 | 17.6 | 11.8 | 17.6 | 17.6 | 21.2 | 11.8 |
| Rubbery copolymer (2): | | | | | | | | |
| Code | | II | II | III | III | IV | IV | V |
| Parts by weight | | 2.7 | 6.7 | 19.6 | 9.8 | 10.0 | 4.0 | 10.0 |
| General purpose polystyrene, parts by wt | | 76.1 | 75.7 | 68.6 | 72.6 | 72.4 | 74.8 | 78.2 |
| Overall styrene:butadiene ratio of blend | | 80:20 | 80:20 | 80:20 | 80:20 | 80:20 | 80:20 | 80:20 |

¹ 13.3% of 1,4-dihydronaphtahlene.
² 63.3% of 1,4-dihydrobenzene.

TABLE V.—PHYSICAL PROPERTIES OF 90:10 STYRENE-BUTADIENE BLENDS

| Properties | Blends | | | | Comparative Ex. E |
|---|---|---|---|---|---|
| | Ex. 5 | Ex. 6 | Ex. 7 | Ex. 8 | |
| Tensile strength, p.s.i. | 4,800 | 4,800 | 3,900 | 3,900 | 5,000 |
| Flexural stiffness, p.s.i. | 162,000 | 158,000 | 162,000 | 162,000 | 149,000 |
| Izod unnotched impact strength, ft. lbs./sq. in. | 8.80 | 6.30 | 9.54 | 7.74 | 2.00 |
| Tensile strength×impact strength×stiffness | $4.59\times10^9$ | $4.78\times10^9$ | $6.03\times10^9$ | $4.89\times10^9$ | $1.49\times10^9$ |
| Processability | (1) | (1) | Good | Good | Poor |

[1] Very good.

TABLE VI.—PHYSICAL PROPERTIES OF 80:20 STYRENE:BUTADIENE BLENDS

| Properties | Blends | | | | | | Comparative Ex. F |
|---|---|---|---|---|---|---|---|
| | Ex. 9 | Ex. 10 | Ex. 11 | Ex. 12 | Ex. 13 | Ex. 14 | |
| Tensile strength, p.s.i. | 3,700 | 3,700 | 3,900 | 4,200 | 3,000 | 2,700 | 3,600 |
| Flexural stiffness, p.s.i. | 134,000 | 136,000 | 119,000 | 122,000 | 126,000 | 136,000 | 128,000 |
| Izod unnotched impact strength, ft. lbs./sq. in. | 8.2 | 6.4 | 9.3 | 6.4 | 10.8 | 9.7 | 4.5 |
| Tensile strength×impact strength×stiffness | $4.06\times10^9$ | $3.2\times10^9$ | $4.3\times10^9$ | $3.3\times10^9$ | $4.1\times10^9$ | $3.6\times10^9$ | $2.07\times10^9$ |
| Processability | (1) | (1) | Excellent | Excellent | Good | (1) | Good |

[1] Very good.

Examples 5 through 8 and comparative Example E in Table V refers to impact resistant polystyrene resin compositions having a 90:10 styrene:butadiene ratio and Examples 9 through 14 and comparative Example F in Table VI refer to impact resistant polystyrene compositions having a styrene:butadiene ratio of 80:20.

ANALYSIS OF DATA

From the data in Table V, it can be seen that the composition prepared according to this invention, Examples 5 through 9, containing two different alfin rubbers with overall composition of 90 parts to 10 parts by weight butadiene to styrene have greater impact resistance and a better balance of properties than does comparative Example E which employs a combination of a commercial polybutadiene along with the alfin rubber I. Examples 5 and 6 employ the unmodified high molecular weight alfin rubber used in comparative Example A in Table II. These data show that stiffness exceeds that obtained with the alfin rubber alone, and also that impact strength is very substantially improved. Tensile strength remains on the same range of value as with the blend for the high molecular weight elastomers employed singly. Examples 7 and 8 further show the significant improvement obtainable by using more than one alfin rubber.

These data illustrate that the improvements of this invention are not obtained by employing another rubbery copolymer in place of the second alfin rubber. Hardness is decreased, impact strength is decreased, and processability is not improved. This is especially surprising and it is not understood why the use of two different polymers should degrade impact strength and the other physical properties.

Likewise, the next series of examples set forth the improvements for an 80:20 combined styrene:butadiene ratio in the blended compositions. Examples 9 through 12 are compared with comparative Example B from Tables I and III. Comparative Example F provides a negative example like Example E. Here again impact resistance is substantially improved, stiffness is improved or remains in the same range, hardness remains in the same range, tensile strength remains in the same range, while processability in general is improved. Overall an improved balance of properties is obtained and a tougher, more resistant-to-destruction plastic results when two alfin rubbers are combined, but inferior properties are obtained using one commercial elastomer in combination with an alfin rubber.

Another unusual aspect of this invention is shown by a comparison of Examples 5, 6, 9 and 10 containing the high molecular weight alfin rubber with comparative Examples E and F, containing the commercial GRS rubber. Whereas both the high molecular weight alfin rubber and GRS rubber are both relatively poor impact improvers, alone, the multicomponent compositions containing the high molecular weight alfin rubbers show a quite good balance of properties but the blends containing the GRS rubber are rather poor.

In the next series of tests, the most effective alfin rubber modified polystyrene compositions are shown which contain a gel content in the alfin rubber as defined above.

Alfin rubber VI

To the quart soda bottle reactor was charged 400 parts by weight of dry hexane, 10.3 parts by volume of 1,4-dihydrobenzene molecular weight control modifier solution (containing 63.3% of 2,4-dihydrobenzene), 54.8 parts by weight of styrene, and 56.9 parts by weight of butadiene under nitrogen atmosphere at about −15° C. Then 120 parts by volume of alfin catalyst suspension was injected and the bottle was sealed and shaken. The reaction was allowed to proceed at ambient temperature for 18 hours with occasional shaking. The bottle was then opened and a rubbery copolymer was removed. Using a Waring blender the polymer was washed three times with 100 parts by volume of 180-proof ethanol containing 0.2% of N-phenyl-β-naphthylamine as antioxidant, three times with 100 parts by weight of water, and then once with 100 parts by volume of acetone. The shredded product was dried at 50° C. and 2 mm. Hg to yield 106.6 parts by weight (95%) of finished copolymer. Polymer gel content of this alfin rubber copolymer having a molecular weight of 200,000 was found to be zero.

Alfin rubber VII

Four hundred parts by volume of dry hexane, 53.1 parts by weight of butadiene, 47.3 parts by weight of styrene, and 8.1 parts by volume of 1,4-dihydronaphthalene modifier solution (containing 13.3% of dihydronaphthalene) were placed in the bottle reaction under nitrogen atmosphere at about −15° C. Then 100 parts by volume of the alfin catalyst suspension was injected and the bottle was sealed and shaken. The reaction was allowed to proceed for two hours with occasional shaking. The copolymer was removed from the bottle as a thick, semi-solid mass swollen with solvent and then washed and dried as noted above to yield 101.4 parts by weight of finished alfin rubber having a molecular weight of 250,000. The polymer gel content was determined to be 24.9% by weight.

Alfin rubber VIII

Alfin rubber I was masticated on a two-roll rubber mill at 300–320° F. for ten minutes to introduce gel. At the end of the required mixing time the rubbery polymer was removed from the mill as a sheet and rapidly cooled. Polymer gel content was determined to be 30.4% by weight.

Alfin rubber IX

Alfin rubber I was masticated on a two-roll rubber mill at 300–320° F. for thirty minutes. At this time the rubbery polymer was removed from the mill as a sheet and rapidly cooled. Polymer gel content was determined to be 64.9% by weight.

Alfin rubber X

Alfin rubber I was fluxed on a warm (200–225° F.) two-roll rubber mill and 0.1% by weight of dicumyl peroxide was added. The temperature was raised to 300–325° F. and the alfin rubber was vigorously masticated for 5 minutes. It was then removed from the mill as sheet, rapidly cooled, and then subdivided into small pieces. Polymer gel content was determined to be 40.9% by weight.

Alfin rubber XI

Using the procedure outlined for alfin rubber VI, 0.5% of dicumyl peroxide by weight was employed to introduce gel into alfin rubber I. Mastication time at 300–325° F. was ten minutes. Polymer gel content was determined to be 59.3% by weight.

Alfin rubber XII

Following the polymerization procedure as described in connection with alfin rubber I with the exception that the amount of 1,4-dihydronaphthalene molecular weight control modifier was decreased from 25 cc. to 3 cc., an alfin rubber was prepared having a molecular weight of 720,000 and containing 15 parts by weight of combined styrene and 85 parts by weight of combined butadiene. The gel content was 40.1% by weight.

Alfin rubber XIII

Following the polymerization procedure as outlined in connection wtih alfin rubber I with the exception that the amount of 1,4-dihydronaphthalene molecular weight control modifier was decreased from 25 cc. to 3 cc., an alfin rubber was prepared having a molecular weight of 590,000 and containing 15 parts by weight of combined styrene and 85 parts by weight of combined butadiene. The gel content was 39.5% by weight.

Example 15

A two-roll compound mill was employed to obtain thorough mixing of components and form Blend No. 15. To 87.4 parts by weight of a general purpose polystyrene resin (having a melt index flow rate ($I_2$) of 0.80 g./10 min. and a molecular weight of 100,000 as determined by the Staudinger method) fluxing on the warm (225–250° F.) mill were added 10.6 parts by weight of alfin rubber I and 2 parts by weight of alfin rubber VI. The three polymers were fluxed on the mill at 300–325° F. until substantially homogeneous (until the pearly luster disappeared) which required 40 minutes. The blend was removed from the mill as a sheet and cooled and then granulated. The subdivided resin was injection molded into physical test specimens using a 1-oz. Minijector molder. Physical properties were determined by testing analysis and are reported in Table VIII while the ingredients of the blend are summarized in Table VII.

Examples 16–24

Using the general procedure described above and employing mixing times varying from 30 to 50 minutes as needed to obtain a substantially homogeneous mixture, Blends 20–28 were prepared using the ratio of ingredients as indicated in Table VII. The blends were processed and evaluated as indicated above and the physical properties data listed in Table VIII.

Example 25

To 88.2 parts by weight of general purpose polystyrene (having a melt index flow rate ($I_2$) of 0.87 g./10 min. and having a molecular weight of 100,000 as determined by the Staudinger method) fluxing on a warm two-roll compound mill, 11.8 parts by weight of alfin rubber XII was added, and the two polymers were fluxed on the mill at 325° F. until substantially homogeneous (until the pearly luster disappeared) which required 40 minutes. The Blend No. 25 was removed from the mill as a sheet, cooled, granulated, and injection molded as described above. Physical properties are listed in Table VIII while the ingredients of the blend are summarized in Table VII.

Example 26

Following the procedure described in Example 25, alfin rubber XII in a quantity of 23.5 parts by weight was blended with 76.5 parts of the same polystyrene and evaluated for physical properties. The data for Blend No. 26 are tabulated in Tables VII and VIII.

Example 27

Following the procedure outlined in Example 26, alfin rubber XIII in a quantity of 11.8 parts by weight was fluxed with 88.2 parts by weight of the same polystyrene at 325–350° F. for 45 minutes. Data concerning the composition of Blend 27 are summarized in Table VII, while physical property data are listed in Table VIII.

Example 28

Following the procedure of Example 27, the same polymers were mixed except that 76.5 parts of polystyrene and 23.5 parts of alfin rubber X were used. Data are reported for Blend No. 28 in Tables VII and VIII.

TABLE VII.—COMPOSITION OF BLENDED RESINS

| Blend numbers | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Blend components: | | | | | | | | | | | | | | |
| Rubbery copolymers: | | | | | | | | | | | | | | |
| No | I | VI | VII | VI | VII | VI | I | VII | VII | VIII | XII | XII | XIII | XIII |
| Parts by weight | 10.6 | 2.0 | 1.9 | 2.0 | 1.9 | 4.9 | 21.2 | 3.8 | 3.8 | 3.8 | 11.8 | 23.5 | 11.8 | 23.5 |
| Polymer gel content, wt. percent | 0 | 0 | 24.9 | 0 | 24.9 | 0 | 0 | 24.9 | 24.9 | 24.9 | 40.1 | 40.1 | 39.5 | 39.5 |
| No | VI | IX | IX | VIII | X | XI | VI | VIII | X | IX | | | | |
| Parts by weight | 2.0 | 10.6 | 10.6 | 10.6 | 10.6 | 8.8 | 3.9 | 21.2 | 21.2 | 21.2 | | | | |
| Polymer gel content, wt. percent | 0 | 64.9 | 64.9 | 30.4 | 40.9 | 59.3 | 0 | 30.4 | 40.9 | 40.9 | | | | |
| General purpose polystyrene, parts by weight | 87.4 | 87.4 | 87.5 | 87.4 | 87.5 | 86.3 | 74.9 | 75.0 | 75.0 | 75.0 | 88.2 | 76.5 | 88.2 | 76.5 |
| Styrene-butadiene, wt. ratio of blend | 90:10 | 90:10 | 90:10 | 90:10 | 90:10 | 90:10 | 80:20 | 80:20 | 80:20 | 80:20 | 90:10 | 80:20 | 90:10 | 80:20 |
| Total polymer gel content, wt. percent | 0 | 6.9 | 7.4 | 3.2 | 4.8 | 5.2 | 0 | 7.4 | 9.6 | 14.7 | 4.7 | 9.4 | 4.7 | 9.3 |

TABLE VIII.—PROPERTIES OF BLENDS CONTAINING POLYMER GEL

| Blend numbers | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Tensile strength, p.s.i. | 5,400 | 5,300 | 5,500 | 5,400 | 5,300 | 5,400 | 3,800 | 4,100 | 4,000 | 4,000 | 6,300 | 5,000 | 6,700 | 4,600 |
| Flexural stiffness, p.s.i. | 150,000 | 161,000 | 160,000 | 160,000 | 160,000 | 150,000 | 120,000 | 130,000 | 130,000 | 140,000 | 150,000 | 130,000 | 160,000 | 130,000 |
| Hardness (Durometer D) | 82 | 82 | 83 | 81 | 82 | 82 | 72 | 75 | 75 | 75 | 81 | 75 | 82 | 75 |
| Izod notched impact, ft. lbs./in. | 0.30 | 0.87 | 0.86 | 0.72 | 0.60 | 0.52 | 0.44 | 2.31 | 1.38 | 1.71 | 0.50 | 0.82 | 0.42 | 0.77 |
| Gel content, wt. percent | 0 | 6.9 | 7.4 | 3.2 | 4.8 | 5.2 | 0 | 7.4 | 9.6 | 14.7 | 4.7 | 9.4 | 4.7 | 9.3 |
| Styrene-butadiene, wt. ratio of blend | 90:10 | 90:10 | 90:10 | 90:10 | 90:10 | 90:10 | 80:20 | 80:20 | 80:20 | 80:20 | 80:20 | 80:20 | 90:10 | 80:20 |
| Impact×stiffness×tensile ($\times 10^9$) | 2.5 | 7.4 | 7.4 | 6.3 | 5.2 | 4.2 | 2.03 | 12.7 | 7.3 | 9.3 | 4.7 | 5.1 | 4.4 | 4.5 |

ANALYSIS OF DATA

As indicated by the above tables, Blend 15 consists of two alfin rubbers of different comonomer ratio with both containing no polymer gel. Blend 16 employs the same two alfin rubbers at the same proportions except that alfin rubber I has been masticated to incorporate polymer gel (alfin rubber IX). The effect of incorporation of polymer gel is clearly indicated by the data since impact strength is substantially improved, flexural stiffness is improved, and tensile strength and hardness remain substantially unchanged.

Blend 17 illustrates the use of two alfin rubbers, both containing polymer gel. Alfin rubber IX contains polymer gel formed by mastication of alfin rubber I, while alfin rubber XII contains polymer gel formed during the polymerization of the copolymer. In comparison with a polymer blend prepared with alfin rubbers containing no gel, the improvements in properties is clearly indicated by Blend 17 which has substantially better impact resistance, higher stiffness, and tensile strength in the same range.

Blend 18 composition contains the two elastomers of Blend 15 in the same proportions except that alfin rubber I was masticated to incorporate polymer gel (alfin rubber VIII) and the degree of gel incorporation is less than that for alfin rubber IV, employed in Blend 16. The improvement in properties corresponds to that obtained in Examples 15 and 16.

Blend 19 illustrates the use of two alfin rubbers with both containing polymer gel similar to Example 16 except that alfin rubber X contains polymer gel formed by mastication of alfin rubber I with peroxide catalyst present. Compared to a blend without gel content, this composition has a substantially higher impact strength, improved stiffness and hardness, and tensile strength in the same range.

Blend 20 illustrates the use of two alfin rubbers, one containing no gel and the other containing gel formed by the use of peroxide catalyst. Alfin rubber XI also has a higher gel content than alfin rubber X employed in Example 19. For this blend, impact strength is substantially improved while other properties remain unchanged. These data indicate that the polymer gel content in alfin rubber XI exceeds that needed for optimum properties.

Blend 21 consists of two alfin rubbers of different comonomer ratio, with both containing no polymer gel. It compares with Blend 15 except that a higher incorporation of alfin rubber is employed such that the overall total butadiene concentration is 20% by weight versus 10% by weight for Blend 15; Blends 22, 23 and 24 also illustrate the use of two alfin rubbers with both containing gel and alfin rubber VII having gel formed during polymerization. Blends 22 and 24 have gel formed by mastication but differ as to total gel content, while Blend 23 has the alfin rubber with gel formed with peroxide catalyst. All three blends illustrate the substantial improvement in impact strength, the improved stiffness and hardness, and the retention of tensile strength by the incorporation of polmyer gel.

Blends 25, 26, 27 and 28 illustrate the excellent impact strength, stiffness, hardness, and tensile strength obtained when utilizing a single alfin rubber blended with the polystyrene resin even as compared to Blends 15 and 21 where two alfin rubbers were blended with the polystyrene but neither alfin rubber contained gel. This is particularly surprising since blends containing more than a single alfin rubber generally display superior properties to blends containing a single alfin rubber.

Commercial impact-resistant polystyrene resins prepared according to the prior art are known to contain the optimum proportions of elastomer. Generally, these materials are formed by graft or block polymerization, as opposed to the mechanical type of mixing used in the above examples, and in addition contain a certain proportion of gelled polymer, to further improve impact resistance and the overall balance of properties of the resin composition. The applicants have selected six commercial impact resistant polystyrene resin compositions, to compare with the resins prepared according to the present invention. In each case, the resin was molded into test pieces and the same tests were carried out as set forth above for the resins of the present invention. Table IX below tabulates the results of the tests on these resins and also includes the product of impact strength times tensile strength times flexural stiffness to show the overall balance of properties for each given resin.

TABLE IX.—PROPERTIES OF COMMERCIAL POLYSTYRENE RESINS

| Type | Resin number | Tensile strength, p.s.i. | Flexural stiffness, p.s.i. | Izod impact notched, ft. lbs./in. notch | Impact× tensile× stiffness (×10⁹) |
|---|---|---|---|---|---|
| Medium impact | Styron 315-27-71 | 4,300 | 160,000 | 0.48 | 3.3 |
|  | Lustrex MT 48-29 | 4,000 | 160,000 | 0.62 | 4.0 |
|  | Fostarene 324 D-3AH | 4,100 | 140,000 | 0.68 | 3.5 |
| High impact | Lustrex HT 88-29 | 3,390 | 140,000 | 0.72 | 3.5 |
|  | Fosta Tuf-Flex 226D-3AH | 3,800 | 120,000 | 0.90 | 4.4 |
|  | Styron 480 | 3,800 | 104,000 | 2.35 | 9.3 |

Three medium impact commercial resins and three high-impact commercial resins were selected for testing. A comparison of the physical properties of the commercial resins with the physical properties of gel-containing resins according to the present invention, as set forth in Table VIII shows the surprising advantage of the present invention. The three medium-impact resins, having an Izod notched impact strength of from 0.48 to 0.68 ft. lbs./in. notch can be be compared with Examples 20, 19 and 18 having Izod notched impact strengths of from 0.52 to 0.72, slightly higher in each case than that of the commercial resins. Examples 18, 19 and 20 show in each case equal or greater flexural stiffness, a substantial improvement in tensile strength and an overall superior balance of properties.

In the high impact range, two commercial resins were selected having an Izod notched impact strength of .72 and 0.9 ft. lbs./in. notch. These are comparable to Examples 18, 16 and 17 having an Izod notched impact strength of 0.72, 0.87 and 0.86. In each case, the overall balance of properties and the tensile strength and flexural stiffness were substantially better for the composition of this invention. As further proof of the improvement, Example 23 above, having an Izod notched impact strength of 1.38 ft. lbs./in. notch, shows an increase in flexural stiffness compared to the commercial resin having an impact strength of 0.9 ft. lbs./in notch and approximately the same tensile strength. Accordingly, by following this invention a material is obtained which has a higher impact strength for a given overall balance of physical properties, including tensile strength and flexural stiffness, or for a given impact strength the overall balance of properties is improved.

One ultra-high-impact resistant commercial resin was tested having an Izod notched impact strength of 2.35 ft. lbs. per inch of notch. This should be compared with Example 22 which has an impact strength of 2.31 ft. lbs. per notch. Although the impact strengths are extremely close, within a couple of percent, well within the range of accuracy for this type of determination, the flexural stiffness of the Example 22 is approximately 30% greater and the tensile strength is also slightly higher. The overall product of impact strength times flexural stiffness times tensile strength for the commercial resin is substantially lower than for Example 22.

Accordingly, compared to the broad range of materials available commercially, which represent the optimum proportions of multi-component elastomers and proportions of gel for polystyrene compositions, the compositions of this invention exhibit an overall superiority.

Having regard to the foregoing disclosure, the following is claimed as the inventive and patentable embodiments thereof:

1. A composition comprising a blend of
   (A) 50 to 99.5% by weight of a monovinyl aromatic polymer resin and
   (B) 0.5 to 50% by weight of an alfin rubber,
       said monovinyl aromatic polymer resin (A) consisting essentially of at least one polymer selected from the group consisting of (1) polymerized monovinyl aromatic hydrocarbons of the benzene series having the vinyl radical directly attached to a carbon atom of the aromatic nucleus and (2) interpolymers of at least 70% by weight of at least one such monovinyl aromatic hydrocarbon and an alpha-alkyl styrene; and said alfin rubber (B) consisting essentially of at least one polymer selected from the group consisting of (1) butadiene homopolymers and (2) interpolymers of at least about 45% by weight of butadiene with at least one monomer selected from the group consisting of conjugated aliphatic dienes and monovinyl aromatic hydrocarbons of the benzene series, said alfin rubber (B) including at least a major proportion of polymer having a molecular weight of 50,000 to 1,250,000 and prepared by polymerizing the respective monomeric material in the presence of an alfin catalyst consisting essentially of an alkali metal salt of a methyl-n-carbinol, an alkali metal halide and an alkali metal alkenyl compound, to the desired molecular weight.

2. A composition as defined in claim 1 wherein the alfin rubber (B) includes a gel content sufficient to render the percentage of gel in the total blend between about 1% and about 25% by weight.

3. A composition as defined in claim 2 wherein the over-all gel content of the blend is about 3 to 8%.

4. A composition as defined in claim 2 wherein said alfin rubber (B) has a gel content of 2 to 80% by weight.

5. A composition according to claim 4 wherein said gel is produced by mastication of the alfin rubber and comprises about 25 to about 70% by weight of the alfin rubber.

6. A composition according to claim 4 wherein said gel is produced by mastication of the alfin rubber in the presence of a peroxide catalyst and comprises about 25 to about 50% by weight of the alfin rubber.

7. A composition according to claim 4 wherein said gel is produced by polymerization of the alfin rubber in the presence of a cross-linking agent and comprises about 10 to about 50% by weight of the alfin rubber.

8. A composition according to claim 4 wherein said gel is produced by polymerization of the alfin rubber in the presence of about 0.1 to about 5% by weight of a molecular weight moderator selected from the group consisting of 1,4-dihydrobenzene and 1,4-dihydronaphthalene and wherein the gel constitutes about 10% to about 50% by weight of the alfin rubber.

9. A composition as defined in claim 1 wherein (B) comprises a single polymer.

10. A composition as defined in claim 9 wherein (B) is polybutadiene.

11. A composition as defined in claim 9 wherein (B) is a butadiene-styrene copolymer.

12. A composition as defined in claim 1 wherein (A) is polystyrene.

13. A composition as defined in claim 12 wherein (B) is a copolymer of styrene and butadiene containing at least 48% combined butadiene.

14. A composition as defined in claim 12 wherein the styrene comprises 60–95% of the over-all blend.

15. A composition as defined in claim 13 wherein the styrene comprises 60–95% of the over-all blend.

16. A composition as defined in claim 1 wherein (B) comprises a mixture of at least two polymers.

17. A composition as defined in claim 16 wherein (B) comprises a mixture of at least two polymers selected from the group consisting of polybutadiene, butadiene-styrene copolymer, butadiene-isoprene copolymer, and butadiene-isoprene-styrene terpolymer.

18. A composition as defined in claim 17 wherein (B) is a blend of two butadiene-styrene copolymers having different ratios of polymerized monomers.

19. A composition as defined in claim 18 wherein (B) is a blend of at least two butadiene-styrene copolymers differing from each other in combined butadiene content by 10% by weight to 25% by weight.

20. A composition as defined in claim 16 wherein (B) contains at least one polymer having a molecular weight over 2,000,000.

21. A composition as defined in claim 20 wherein (B) is a mixture of two butadiene-styrene copolymers one of which has a molecular weight over 2,000,000.

22. A composition as defined in claim 1 wherein (A) is polystyrene and (B) comprises a mixture of at least two polymers.

23. A composition as defined in claim 22 wherein (B) is a blend of at least two butadiene-styrene copolymers differing from each other in combined butadiene content by 10% by weight to 25% by weight.

24. A composition as defined in claim 22 wherein (B) contains at least one polymer having a molecular weight over 2,000,000.

25. A composition as defined in claim 22 wherein (B) is a mixture of two butadiene-styrene copolymers one of which has a molecular weight over 2,000,000.

26. A composition as defined in claim 22 wherein at least one of the polymers comprising (B) includes a gel content sufficient to render the percentage of gel in the total blend between about 1% and about 25% by weight.

27. A composition in accordance with claim 1, wherein the alfin rubber is prepared in the presence of an alfin catalyst consisting essentially of a sodium alkoxide, a sodium alkenyl compound and an alkali metal halide.

References Cited
UNITED STATES PATENTS

| | | | |
|---|---|---|---|
| 2,600,024 | 6/1952 | Romeyn et al. | 260—893 |
| 2,681,898 | 6/1954 | Daly | 260—892 |
| 3,021,300 | 2/1962 | Ardley et al. | 260—892 |
| 3,041,310 | 6/1962 | Luftglass et al. | 260—876 |
| 3,067,187 | 12/1962 | Greenberg et al. | 260—94.2 |
| 3,090,767 | 5/1963 | Colgan et al. | 260—892 |
| 3,317,918 | 5/1967 | Foster | 260—83.7 |

FOREIGN PATENTS

| | | | |
|---|---|---|---|
| 740,188 | 11/1955 | Great Britain | 260—892 |
| 843,729 | 8/1960 | Great Britain | 260—892 |
| 858,776 | 1/1961 | Great Britain | 260—876 |
| 641,965 | 5/1962 | Canada | 260—892 |
| 899,464 | 3/1963 | France | 260—880 |

MURRAY TILLMAN, Primary Examiner

M. J. TULLY, Assistant Examiner

U.S. Cl. X.R.

260—91.2, 94.7, 83.7, 85.1